(12) United States Patent
Kress et al.

(10) Patent No.: US 7,097,400 B2
(45) Date of Patent: Aug. 29, 2006

(54) TOOL AND METHOD FOR THE FINISHING OF VALVE SEATS AND GUIDES

(75) Inventors: Dieter Kress, Aalen (DE); Friedrich Häberle, Lauchheim (DE)

(73) Assignee: Mapal Fabrik fur Prazision-Swerkzeuge Dr. Kress KG, Aalen (DE)

( * ) Notice: Subject to any disclaimer, the term of this patent is extended or adjusted under 35 U.S.C. 154(b) by 105 days.

(21) Appl. No.: 10/484,858

(22) PCT Filed: Jul. 25, 2001

(86) PCT No.: PCT/EP02/08291

§ 371 (c)(1),
(2), (4) Date: Aug. 17, 2004

(87) PCT Pub. No.: WO03/013771

PCT Pub. Date: Feb. 20, 2003

(65) Prior Publication Data

US 2005/0002746 A1 Jan. 6, 2005

(30) Foreign Application Priority Data

Jul. 25, 2001 (DE) .................. 101 37 000

(51) Int. Cl.
*B23B 41/00* (2006.01)
(52) U.S. Cl. ............. 409/231; 409/234; 408/83.5
(58) Field of Classification Search ......... 409/231, 409/322, 233, 234; 408/83.5, 79, 80, 81, 408/82, 223, 224, 225, 233, 239 A, 239 R, 408/1 R See application file for complete search history.

(56) References Cited

U.S. PATENT DOCUMENTS

| 1,554,669 A | 9/1925 | Watkins |
| 5,044,841 A * | 9/1991 | Biera et al. .......... 409/233 |
| 6,905,278 B1 * | 6/2005 | Kress et al. .......... 409/234 |

FOREIGN PATENT DOCUMENTS

FR 2270975 12/1975

OTHER PUBLICATIONS

International Search Report for PCT/EP02/08291 mailed Nov. 18, 2002, ISA/210-EP.

* cited by examiner

*Primary Examiner*—Monica Carter
*Assistant Examiner*—Dana Ross
(74) *Attorney, Agent, or Firm*—Harness, Dickey & Pierce, P.L.C.

(57) ABSTRACT

It is proposed to provide a tool for the final machining of a valve seat and valve guide in a cylinder block of a combustion engine of a motor vehicle, said tool having a first section with at least one first blade for machining the valve seat and a second section with at least one second blade for machining the valve guide. The tool is characterized in that a separation site (13) is provided between the first section (5) and the second section (9), said separation site comprising a cone (15) and a conical recess (17) capable of receiving said cone.

10 Claims, 1 Drawing Sheet

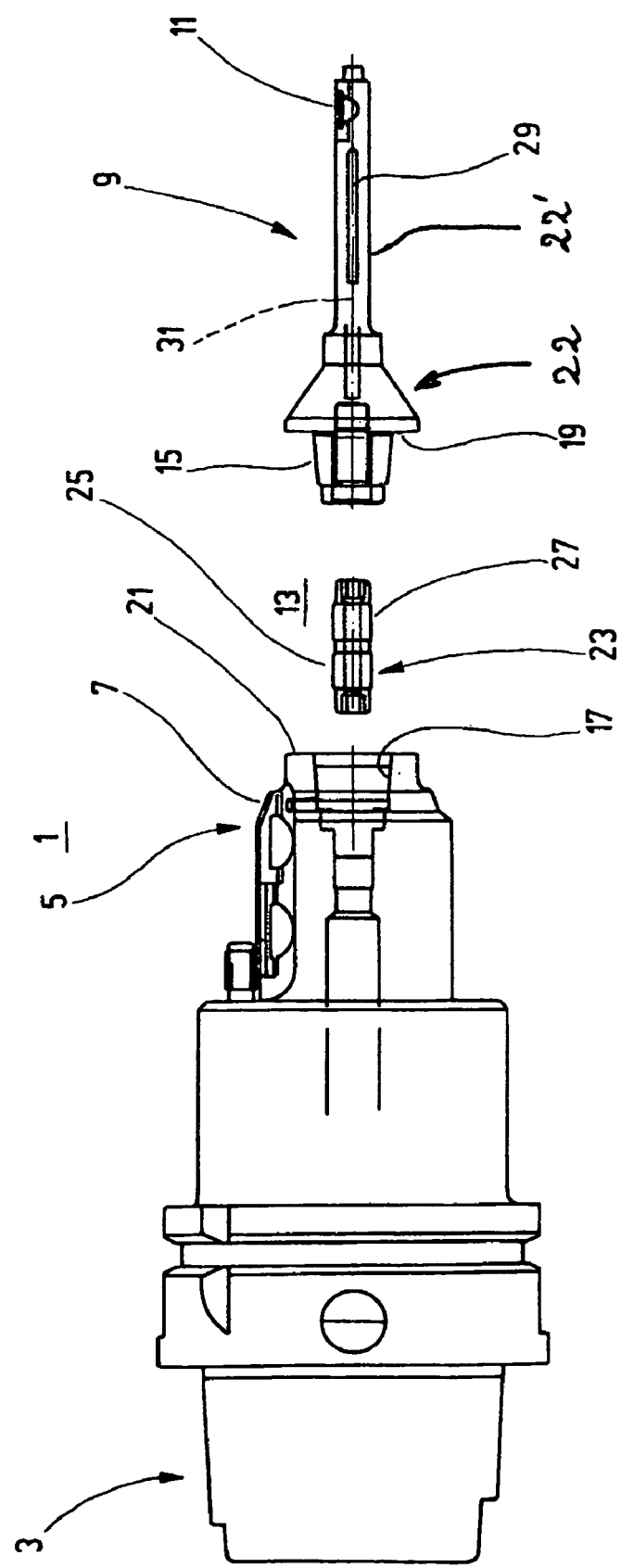

TOOL AND METHOD FOR THE FINISHING OF VALVE SEATS AND GUIDES

CROSS-REFERENCE TO RELATED APPLICATIONS

This application is a National Stage of International Application No. PCT/EP02/08291, filed Jul. 25, 2002 which claims the benefit of German patent application number 101 37 000.8, filed on Jul. 25, 2001.

BACKGROUND AND SUMMARY OF THE INVENTION

The invention relates to a tool for final machining of a valve seat and valve guide in a cylinder head of a combustion engine. The invention also relates to a method for final machining of a valve seat and valve guide in a cylinder head of a combustion engine.

Tools and methods for final machining of a valve seat and valve guide are known. This kind of machining involves one of the most exacting machining in the cylinder head. In particular, the coaxiality of the valve seat and the valve bore is a criterion for the tightness and thus the fuel consumption of the combustion engine. Different methods exist for attaining the required precision which usually is in the range of 0.025 mm maximum.

For the machining of a valve seat and valve guide on a machining center, the known methods require at least two tools, and for very small diameters even three tools, depending on the diameter of the valve guide. With the aid of a tool, a pilot bore is prepared in which the subsequently inserted final machining tool moves during the cutting. The machining time in this case is relatively long because it is necessary first to prepare a pilot bore before the final machining can be done.

Another method is carried out on transfer lines. To achieve the rigidity required for the tool used for machining the valve guide, a feed-out spindle comprising two tools is employed. In this case, a thin tool intended for the valve guide is moveable within another tool and is guided through a bushing.

It has been established that the machining times on a machining center are too long and that the machining on a transfer line requires very expensive tools in order to achieve the precision needed for the machining of a valve seat and valve guide.

Hence, the object of the invention is to provide a tool and a method for the final machining of a valve seat and valve guide in a cylinder block of a combustion engine that do not have these drawbacks.

To reach this objective, we propose a tool characterized in that between a first section of the tool used for the machining of the valve seat and a second section used for the machining of the valve guide there is provided a separation site comprised of a cone and a conical recess to receive said cone. By means of this separation site, the rigidity of the tool is substantially increased. Moreover, the assembly is much simpler and more economical than with feed-out tools.

Other embodiments of the invention are covered by the subclaims.

To reach the said objective, we also propose a method for the final machining of a valve seat and valve guide in a cylinder block of a combustion engine. The method is characterized in that the final machining is performed with a single tool. In other words, it is not necessary to create a pilot bore for the final machining using a preliminary machining tool. Also, no guide bushing is needed for the final machining.

A preferred embodiment of the method of the invention is characterized in that the final machining is carried out in a single step. In other words, creating a valve seat and valve guide in a cylinder block does not require a preliminary as well as a final machining.

BRIEF DESCRIPTION OF THE DRAWINGS

In the following, the invention will be explained in greater detail by reference to a drawing. The single drawing shows a tool 1 in exploded side view. Tool 1 comprises a conventional shaft 3 with a slightly conical outer contour and which serves for coupling with a tool machine.

DETAILED DESCRIPTION OF THE PREFERRED EMBODIMENTS

Tool 1 comprises a first section 5 with at least a first cutting plate 7 provided with a blade for machining the valve seat.

Furthermore, tool 1 comprises a second section 9 with a second cutting plate 11 provided with a blade for machining the valve guide. The two sections 5 and 9 of tool 1 are connected to each other through a separation site 13. Said site comprises a cone 15 provided on the second section 9, said cone fitting into a conical recess 17 provided on the first section 5 of tool 1. To cone 15 is assigned a first plane surface 19, and to conical recess 17 a second plane surface 21. In the assembled condition, sections 5 and 9 of tool 1 are placed very close to each other in the region of separation site 13 so that the second section 9 is in a defined alignment with the first section 5. By means of cone 15 and conical recess 19, it is ensured that the two sections 5 an 9 are disposed exactly coaxially to one another.

Plane surfaces 19 and 21 are preferably annular surfaces to ensure a circular contact surface for the two sections 5 and 9 of tool 1 in the region of separation site 13.

The drawing shows that the second section 9 presents a widened region 22 starting from the first plane surface 19, said region being located between the first plane surface 19 with a larger outer diameter and the actual tool 22' of the second section 9 and here, for example directly adjacent to the first plane surface 19, presenting a cylindrical section which conically tapers off in the direction of cutting plate 11. To this there may be connected another section with a cylindrical outer surface the outer diameter of which is larger than that of the actual tool 22' performing the final machining of the valve guide.

The widened region, also referred to as a collar, is made of the same material as the actual tool 22' in order to achieve optimum tool rigidity and reduced vibration characteristics.

Separation site 13 comprises a tightening screw 23 with two threaded sections 25 and 27 the turns of which run in opposite directions. Tightening screw 23 is used to thoroughly press together the two elements of the separation site 13, namely the two sections 5 and 9 of tool 1. When tightening screw 23 is loosened, the two sections 5 and 9 of tool 1 are pushed apart so that the clamping forces between cone 15 and conical recess 17 are reduced.

To accomplish the final machining of a valve seat and valve guide in a cylinder block of a combustion engine, the two sections 5 and 9 of tool 1 are tightened against each other in the region of separation site 13 so that cone 15 enters conical recess 17 and the two plane surfaces 19 and 21 are disposed close to each other. In this manner, high rigidity of tool 1 and absolutely accurate mutual lengthwise positioning of sections 5 and 9 are achieved.

The second section 9 of tool 1 is shaped as a reamer for the machining of the valve guide. Usually, in addition to the second cutting plate, at least one guide gib is provided in the region of the second section 9. The drawing shows a guide gib 29 facing the observer.

It is essential for the tool described here that the first section 5 and the second section 9 be made of different materials, steel being used preferentially for the first section 5 and serving for the machining of the valve seat, and the second section used for machining the valve guide being made of hard metal.

Compared to steel, hard metal has a higher modulus of elasticity. Hard metals having a modulus of elasticity that is two to three times higher than that of steel are preferably used. Thus, under the same conditions of geometry and stress, first section 5 made of steel stretches or deforms two to three times as much as does the second section 9 consisting of hard metal.

Because the long and slim second section 9 of tool 1 is made of hard metal, high rigidity is achieved here. The rigidity of the entire tool 1 is increased even more by the combination of the described material.

Because a separation site is provided between first section 5 and second section 9 of tool 1 as a result of which the grain orientation within tool 1 is interrupted, vibrations induced in tool 1 by the chip removal from a work piece are particularly well damped.

The high rigidity of tool 1, which is based on the special material combination, the widened region 22 of second section 9 and the interruption of the grain orientation by separation site 13, results in particularly good machining quality during the machining of the valve seat and valve guide with the aid of the herein-described tool 1. The high rigidity of tool 1 is further enhanced by the short cone 15 and the two plane surfaces 19 and 21 and also by the use of hard metal in the region of second section 9.

In the following, the function of tool 1 and the method of final machining of a valve seat and valve guide in a cylinder block of a combustion engine will be discussed in greater detail.

For the purpose of final machining of the two said regions within a cylinder block, the assembled tool 1 is set in rotation and is made to move in relation to the cylinder block. It is made to move in the direction of its rotation axis 31 so that second section 9 with second cutting plate 11 is introduced into the bore serving as valve guide. This results in final machining of the bore surface. Finally, tool 1 is introduced into the cylinder block to a distance such that first cutting plate 7 of first section 5 engages the cylinder block and executes the final machining of the valve seat.

In other words, what is needed to accomplish the final machining of a valve seat and valve guide in a cylinder block is a single tool 1 of the herein-described design. By no means is it necessary to make a pilot bore in the cylinder block to be able to perform the final machining. It is also not necessary to use a guide bushing to be able to ensure guidance when introducing tool 1 into the valve guide. Because of its design, namely because of the presence of separation site 13 between first section 5 and second section 9, tool 1 is so rigid that the valve guide is optimally coaxial with the valve seat. Bending of tool 1 in the region of second section 9 is much reduced compared to tools consisting of a single piece, because the rigidity of tool 1 is substantially enhanced by separation site 13 and by the use of hard metal for the second section 9.

During the final machining of a valve seat and valve guide, exact concentricity of tool 1 is achieved, because cone 15 and conical recess 17 as well as plane surfaces 19 and 21 can be fabricated to very close tolerances. As a result of the high concentricity precision which amounts to <3 μm, alignment and imbalance problems do not arise.

The surface quality of a valve seat and valve guide are further enhanced by the fact that vibrations generated within tool 1 during the fine machining are interrupted at separation site 13, namely at the transition site between second section 9 and first section 5, and are thus markedly damped. The vibrations can also be further reduced by using different materials for the fabrication of the two sections 5 and 9.

Second section 9 of tool 1 can be fabricated separately. As a result, particularly for small machining diameters, the quality of tool 1 is substantially higher than that of conventional, single-piece tools.

From the explanations provided for tool 1 and the manner in which it functions, it is clear that the tool is of very simple design and thus can be fabricated economically. The simple design is due to the fact, among other things, that there is no need for two partial tools that are movable relative to each other, as is the case with feed-out tools. The tool is characterized in that the machining of a valve seat and valve guide in the cylinder block of a combustion engine can be carried out in simple manner: Such machining can be carried out with a single tool. Thus, it is not necessary to use complicated two-part, so-called feed-out tools the parts of which are movable relative to each other and during the machining of a valve seat and valve guide require separate control. Moreover, it is possible to carry out the final machining of a valve seat and valve guide in a cylinder block of a combustion engine in a single machining step. In other words, it is also not necessary to make a pilot bore to enable a subsequent final machining to be carried out.

Furthermore, the simple design of tool 1 permits the machining of different cylinder blocks on the same transfer line. This is possible because the herein-described tool can be changed automatically in simple fashion.

Finally, a universal use of tool 1 is also possible, on the one hand, because the materials used to fabricate first section 5 and second section 9 can be optimized for different applications. In other words, it is possible, by the selection of special damping tools, to reduce the vibrations within tool 1, vibrations that are already markedly reduced by the presence of separation site 13.

Moreover, it is possible to use tools with different sections 5 and 9. In other words, it is possible, in simple fashion, to subject valve seats and valve guides of different diameters to final machining, because first section 5 and second section 9 having different machining diameters can be combined with one another. The close tolerances for cone 15 and plane surfaces 19 and 21 result in high precision when different sections of a tool are assembled. Moreover, in each case the high rigidity and the good damping properties of the tool are retained.

The invention claimed is:

1. Tool for final machining of a valve seat and valve guide in the cylinder block of a combustion engine of a motor vehicle, said tool having a first section provided with at least one first blade for machining the valve seat and a second section provided with at least one second blade for machining the valve guide, a separation site provided between the first section and the second section, said separation site comprising a cone and a conical recess capable of receiving said cone the separation site including two plane surfaces of which the first one is disposed on the first section and the second one is disposed on the second section and wherein when the first and second sections are mounted together for final machining the first and second plane surfaces are firmly pressed together and the cone and conical recess are firmly pressed together thereby coaxially aligning the first and second sections.

2. Tool according to claim 1, wherein at least one of the first plane surface and the second plane surface have the shape of an annular surface.

3. Tool according to claim 1, wherein steel is used for the first section and hard metal for the second section.

4. Tool according to claim 1, wherein the second section has a widened region.

5. Tool according to claim 4, wherein the widened region is adjacent to the separation site.

6. Tool according to claim 1, wherein when the first and second sections are mounted together for final machining relative rotation therebetween is prevented.

7. Method for final machining of a valve seat and a valve guide in the cylinder block of a combustion engine of a motor vehicle by a tool comprising a first section provided with at least one first blade for machining the valve seat and a second section provided with at least one second blade for machining the valve guide and a separation site between the first section and the second section, the separation site comprising a cone and a conical recess capable of receiving the cone, wherein the final machining is carried out with a single tool and the first and second sections are firmly pressed together during the final machining.

8. Method according to claim 7, wherein the final machining is performed in a single step.

9. Method according to claim 7, wherein the separation site includes two plane surfaces of which the first one is disposed on the first section and the second one is disposed on the second section and wherein the first and second plane surfaces are firmly pressed together and the cone and conical recesses coaxially align the first and second sections during the final machining.

10. Method according to claim 7, further comprising maintaining the first and second sections fixed relative to one another during the final machining.

* * * * *

UNITED STATES PATENT AND TRADEMARK OFFICE
CERTIFICATE OF CORRECTION

PATENT NO. : 7,097,400 B2 Page 1 of 1
APPLICATION NO. : 10/484858
DATED : August 29, 2006
INVENTOR(S) : Dieter Kress et al.

It is certified that error appears in the above-identified patent and that said Letters Patent is hereby corrected as shown below:

On the Title Page, Item (73) the portion of the Assignee's name, "Präzision-Swerkzeuge" should be --Präzisionswerkzeuge-- (one word; hyphen removed); and On the Title Page, Item (22) the international filing date should be changed from "2001" to --2002--.

Signed and Sealed this

Seventh Day of August, 2007

JON W. DUDAS
*Director of the United States Patent and Trademark Office*